(12) United States Patent
Sahin et al.

(10) Patent No.: US 12,273,505 B2
(45) Date of Patent: Apr. 8, 2025

(54) ACCOMMODATION INVARIANT NEAR-EYE DISPLAY

(71) Applicant: TAMPERE UNIVERSITY FOUNDATION SR, Tampere University (FI)

(72) Inventors: Erdem Sahin, Tampere (FI); Ugur Akpinar, Tampere (FI); Atanas Gotchev, Tampere (FI); Rajesh Menon, Tampere (FI)

(73) Assignee: TAMPERE UNIVERSITY FOUNDATION SR, Tampere University (FI)

( * ) Notice: Subject to any disclaimer, the term of this patent is extended or adjusted under 35 U.S.C. 154(b) by 169 days.

(21) Appl. No.: 18/303,801

(22) Filed: Apr. 20, 2023

(65) Prior Publication Data
US 2024/0357072 A1    Oct. 24, 2024

(51) Int. Cl.
| | |
|---|---|
| *H04N 13/398* | (2018.01) |
| *G02B 27/42* | (2006.01) |
| *G02B 30/22* | (2020.01) |
| *G06N 3/08* | (2023.01) |
| *H04N 13/122* | (2018.01) |
| *H04N 13/128* | (2018.01) |
| *H04N 13/332* | (2018.01) |

(52) U.S. Cl.
CPC ....... *H04N 13/398* (2018.05); *G02B 27/4205* (2013.01); *G02B 27/4261* (2013.01); *G02B 30/22* (2020.01); *G06N 3/08* (2013.01); *H04N 13/122* (2018.05); *H04N 13/128* (2018.05); *H04N 13/332* (2018.05)

(58) Field of Classification Search
CPC .. H04N 13/398; H04N 13/128; H04N 13/332; H04N 13/122; G02B 30/22; G02B 27/4205; G02B 27/4261; G06N 3/08
See application file for complete search history.

(56) References Cited

PUBLICATIONS

Akipnar et al. "Phase-COded Computational Imaging For Accomodation-Invaraiant Near-Eye Displays" (Included in IDS dated Aug. 2, 2024), 2020.*
International Search Report and Written Opinion in corresponding PCT application No. PCT/EP2024/061114 mailed Jul. 30, 2024 (13 pages).
U. Akpinar, E. Sahin and A. Gotchev, "Phase-Coded Computational Imaging For Accommodation-Invariant Near-Eye Displays," 2020 IEEE International Conference on Image Processing (ICIP), Abu Dhabi, United Arab Emirates, 2020, pp. 3159-3163, doi: 10.1109/ICIP40778.2020.919123.

* cited by examiner

*Primary Examiner* — James T Boylan
(74) *Attorney, Agent, or Firm* — Meunier Carlin & Curfman LLC (57) ABSTRACT

According to an example embodiment, a stereoscopic near-eye display (NED) assembly for a NED device including a pair of NED assemblies is provided, where an input image is subjected to a preprocessing procedure that applies image-area-position dependent preprocessing before providing it for viewing through a lens assembly that comprises a diffractive optical element (DOE) arranged to provide a phase delay that is different through a plurality of positions of its aperture. According to other example embodiments, an apparatus and a method for deriving the preprocessing procedure and the DOE are provided.

19 Claims, 5 Drawing Sheets

ACCOMMODATION INVARIANT NEAR-EYE DISPLAY

TECHNICAL FIELD

The present invention relates to near-eye displays (NEDs).

BACKGROUND

Stereoscopic near-eye displays (NEDs) are of particular interest for application in various virtual reality (VR) and augmented reality (AR) applications. A challenge arises in ensuring comfortable but yet natural or near-to-natural viewing experience via usage of a wearable NED apparatus due to visual discomfort experienced by some users.

One of key challenges in ensuring comfortable viewing experience involves addressing the vergence-accommodation conflict (VAC), which may arise when the NED apparatus is applied to display an object such that its vergence distance does not match its accommodation distance. In viewing VR or AR content using a conventional NED apparatus such situations occur frequently due to displaying objects of a three-dimensional (3D) image having their respective positions within the image space at distances (i.e. at respective vergence distances) that are different from the distance to the position of the (virtual) image plane of the NED apparatus (i.e. the accommodation distance).

While NED apparatuses provided with techniques for addressing the VAC are known in the art, such as varifocal, multifocal, light field, holographic and Maxwellian, they are all subject to their own trade-offs, such as limited eyebox, limited image quality (e.g. low spatial resolution, speckle noise) and/or complex device requirements (e.g. bulky and/or fast optics, accurate eye tracker). Consequently, there is a continued demand for NED apparatuses that enable mitigating the VAC in a manner that provides high user comfort without compromising the image quality and device complexity.

SUMMARY

It is an object of the present invention to provide a technique for reducing or eliminating user discomfort arising from the vergence-accommodation conflict (VAC) in a NED apparatus without significantly reducing the resulting perceptual image quality.

According to an example embodiment, a stereoscopic near-eye display (NED) assembly for a NED device including a pair of NED assemblies is provided, the NED assembly comprising: a two-dimensional (2D) display for rendering an image for viewing by an eye of a viewer, a lens assembly arranged at a predefined distance from the 2D display to allow for viewing the image rendered via the 2D display therethrough, wherein the lens assembly comprises a diffractive optical element (DOE) arranged to provide a phase delay that is different through a plurality of positions of its aperture; and a display controller comprising a preprocessing portion arranged to derive a preprocessed image based on the received image via application of a preprocessing procedure that is arranged to apply a image-area-position dependent preprocessing in derivation of different sub-areas of an image area of the preprocessed image to account for different transmission characteristic through different sub-apertures of the lens aperture of the lens assembly and supply the preprocessed image for rendering via the 2D display, and wherein preprocessing procedure and the lens assembly are arranged for displaying the preprocessed image as one that is perceived as sharp for a plurality of predefined accommodation depths that reside within an extended depth of field (DoF) of the NED assembly when viewed through the lens assembly so as to facilitate providing accommodation invariant 3D presentation based on the preprocessed image via operation of the NED device.

According to another example embodiment, an apparatus for deriving a preprocessing procedure and a phase delay profile for a stereoscopic NED assembly according to the example embodiment described in the foregoing is provided, the apparatus arranged to apply respective learning models to jointly derive at least one artificial neural network (ANN) that serves as the preprocessing procedure and the phase delay profile that defines a respective phase delay for a plurality of positions of the DOE via an iterative learning procedure based on a plurality of training images, wherein the apparatus is arranged to carry out the following at a plurality of iteration rounds: process each of the plurality of training images trough a learning model that is arranged to carry out the following: select one or more sub-apertures for the respective iteration round and determine respective one or more sub-areas of an image area of the respective training image that spatially correspond to the selected one or more sub-apertures, process the determined one or more sub-areas of the respective training image by the at least one ANN (to determine spatially corresponding one or more sub-areas of a preprocessed image using current weights of the at least one ANN in consideration of their respective positions within the image area, process said one or more sub-areas of the preprocessed image by a display and eye model into spatially corresponding one or more sub-areas of a simulated retinal image in accordance with current phase delay profile and in consideration of an accommodation depth selected for the respective iteration round, and determine, by a predefined loss function, a difference between said one or more sub-areas of the simulated retinal image and spatially corresponding one or more sub-areas of a corresponding reference retinal image; and update the weights of the at least one ANN and a portion of the phase delay profile that spatially corresponds to the one or more selected sub-apertures based on respective differences determined for the plurality of training images.

According to another example embodiment, a method for deriving a preprocessing procedure and a phase delay profile for a stereoscopic NED assembly according to the example embodiment described in the foregoing is provided, wherein the method comprises carrying out an iterative learning procedure based on a plurality of training images via application of respective learning models to jointly derive at least one ANN that serves as the preprocessing procedure and the phase delay profile that defines a respective phase delay for a plurality of positions of the DOE, the method comprising, for a plurality of iteration rounds: processing each of the plurality of training images trough a learning model that comprises the following steps: selecting one or more sub-apertures for the respective iteration round and determining respective one or more sub-areas of an image area of the respective training image that spatially correspond to the selected one or more sub-apertures, processing the determined one or more sub-areas of the respective training image by the at least one ANN to determine spatially corresponding one or more sub-areas of a preprocessed image using current weights of the at least one ANN in consideration of their respective positions within the image area, processing said one or more sub-areas of the preprocessed image by a display and eye model into spatially corresponding one or more sub-areas of a simulated retinal image in accordance with current phase delay profile and in consideration of an accommodation depth selected for the respective iteration round, and determining, by a predefined loss function, a difference between said one or more sub-areas of the simulated retinal image and spatially corresponding one or more sub-areas of a corresponding reference retinal image; and updating the weights of the at least one ANN and a portion of the phase delay profile that spatially corresponds to the one or more selected sub-apertures based on respective differences determined for the plurality of training images.

According to another example embodiment, a computer program is provided, the computer program comprising computer readable program code configured to cause performing the method according to the example embodiment described in the foregoing when said program code is executed on one or more computing apparatuses.

The computer program according to the above-described example embodiment may be embodied on a volatile or a non-volatile computer-readable record medium, for example as a computer program product comprising at least one computer readable non-transitory medium having the program code stored thereon, which, when executed by one or more computing apparatuses, causes the computing apparatuses at least to perform the method according to the example embodiment described in the foregoing.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1A schematically illustrates some aspects of a stereoscopic near-eye display assembly according to an example.

DESCRIPTION OF SOME EMBODIMENTS

Figure 1A:
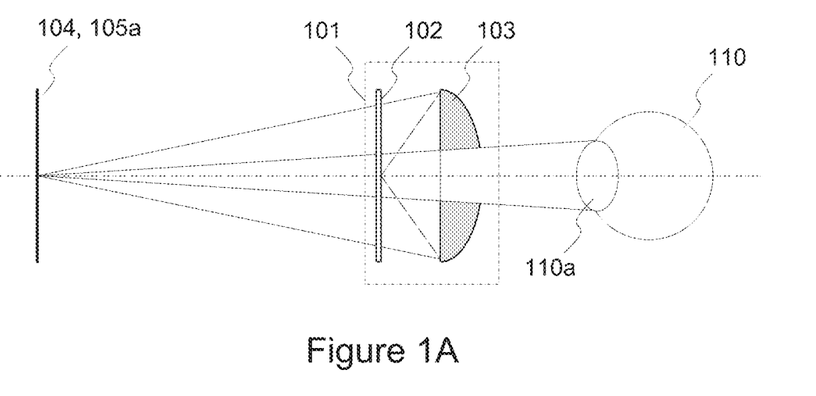
Figure 1B:
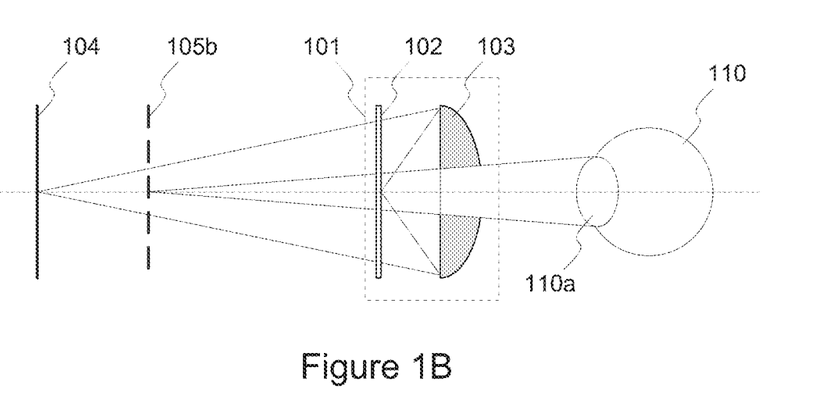
FIG. 1B schematically illustrates some aspects of a stereoscopic near-eye display assembly according to an example.

FIGS. 1A and 1B schematically illustrate some characteristics of a conventional stereoscopic near-eye display (NED) assembly 101 together with an eye 110 of a viewer. The NED assembly 101 comprises a two-dimensional (2D) display 102 and a magnifying lens 103, which are arranged in front of the eyes 110 of the viewer upon operation of the NED assembly 101 for viewing images rendered on the 2D display 102 through the magnifying lens 103. The 2D display 102 is arranged in a fixed position with respect to the magnifying lens 103, where the position of the 2D display 102 is closer to the magnifying lens 103 than its focal distance. Consequently, the 2D display 102 maps to a (virtual) image plane 104, which is positioned at a fixed distance behind the 2D display 102. A NED device may comprise a pair of NED assemblies 101 (i.e. a respective NED assembly 101 for each eye 110 of the viewer) and a display controller arranged to supply respective images of a stereoscopic image pair for rendering on respective 2D displays 102 of the pair of NED assemblies 101 to provide a three-dimensional (3D) presentation of a scene captured in the stereoscopic image pair.

Theoretically, assuming an aberration-free optics, the visual content displayed at the 2D display 102 may be shown with resolution up to the diffraction limit at the image plane 104. At depths (i.e. distances from the 2D display 102) that are offset from the image plane 104, rapid decrease in frequency response with increasing depth is observed due to the defocus blur (or defocus aberration). Hence, the viewer observes a sharp image at a high resolution if an accommodation depth of the eye 110 coincides with the image plane 104, whereas the image observed by the viewer gets increasingly blurred with increasing offset between the accommodation depth of the eye 110 and the image plane 104. In this regard, the example of FIG. 1A illustrates a scenario where an accommodation depth 105a of the eye 110 coincides with the image plane 105 and results in the viewer observing a sharp image, while the example of FIG. 1B illustrates a scenario where an accommodation depth 105b is offset from the image plane 104 and hence results in a blurred image. The accommodation depth may be also referred to as an accommodation distance.

The defocus blur is a major driver of the accommodation depth of the eye 110 in a viewing situation such that the eye 110 typically tends to accommodate at a distance where the image appears sharpest. Consequently, in the arrangement illustrated via the respective examples of FIGS. 1A and 1B the accommodation depth tends to coincide with the image plane 104 or fall in its immediate vicinity, regardless of a vergence distance of an object displayed in the 3D presentation of the displayed image data, thereby leading to perception of a sharp image of the object in the scenario of FIG. 1A while resulting in perception of a blurred image of the object in the scenario of FIG. 1B. Another factor having an effect to the accommodation depth is the binocular disparity: even though the binocular disparity primarily drives the vergence distance, it also affects the accommodation depth. The present disclosure describes an approach where the coupling between the accommodation depth and the vergence distance is employed to eliminate or at least significantly reduce retinal blur in the images displayed by the NED assembly 101 in order to create a viewing situation where the accommodation depth of the eye 110 is predominantly driven by the binocular disparity, thereby aligning the accommodation depth with the vergence distance and, consequently, addressing the VAC. Alternatively, this approach may be considered as extension of the depth of field (DoF) o the NED assembly 101.

Figure 2A:
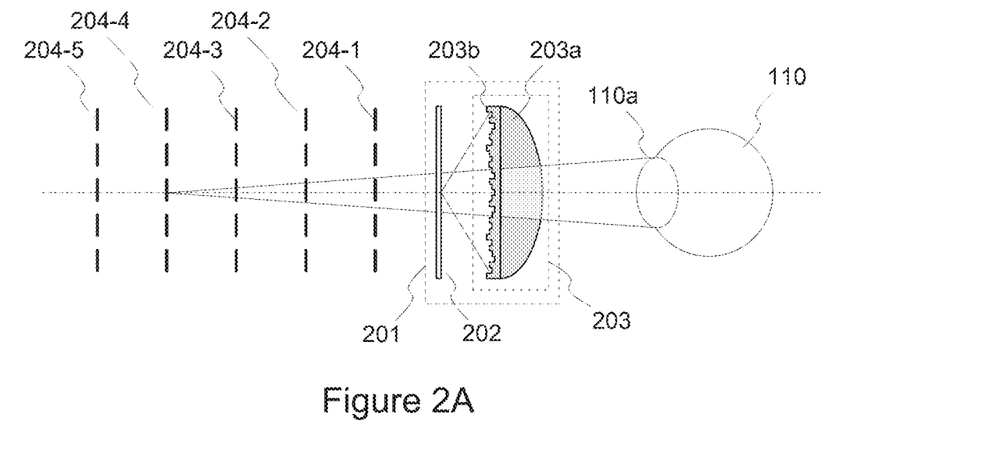
FIG. 2A schematically illustrates some aspects of a stereoscopic near-eye display assembly according to an example.

An improved stereoscopic NED assembly according to present disclosure makes use of wavefront coding in order to extend the DoF in a manner that results in substantially uniform frequency response across multiple (virtual) image planes within the depth range of the NED assembly, thereby substantially providing an accommodation invariant (AI) NED assembly. As an example in this regard, FIG. 2A schematically illustrates some characteristics of an accommodation invariant NED assembly 201 according to the present disclosure together with the eye 110 of a viewer. In the following, the accommodation invariant NED assembly 201 is predominantly referred, in brief, as the NED assembly 201. The NED assembly 201 comprises a 2D display 202 and a lens assembly 203 arranged at a predefined distance from a 2D display 202. A pair of NED assemblies 201 may be provided, for example, as respective elements of a NED device (such as an AR headset or a VR headset) that allows for positioning each of the two NED assemblies 201 in front of the respective eye 110 of the viewer for viewing respective images of a stereoscopic image pair displayed via the respective 2D displays 202 through the respective lens assemblies 203 in order to perceive a 3D presentation of a scene captured in the stereoscopic image pair. In the following, in the interest of brevity and clarity, the description predominantly refers to the NED assembly 201 in singular, whereas the description implicitly applies to both NED assemblies 201 of a NED device.

In the following, the term display plane as applied to refer to the position of the 2D display 202 when referring to the position of the 2D display 202 in relation to other elements of the NED assembly 201 and to various concepts associated with characteristics of the NED assembly 201. Along similar lines, the term lens plane is applied to refer to the position of the lens assembly 203 in relation to other elements of the NED assembly 201 and to various concepts associated with characteristics of the NED assembly 201.

The lens assembly 203 comprises at least a diffractive optical element (DOE) and the lens assembly 203 is arranged to provide the DoF extension via implementing wavefront coding that results in focusing a preprocessed image displayed on the 2D display 202 such that a substantially uniform frequency response is provided over the depth range of the NED assembly 201. According to an example, the lens assembly 203 may include separate optical sub-assemblies for providing, respectively, the imaging/magnification and the DoF extension, whereas according to another example the lens assembly 203 may include a single optical component arranged to provide both the imaging/magnification and the DoF extension. In examples where separate optical sub-assemblies are applied for the imaging/magnification and the DoF extension, the imaging/magnification may be provided e.g. by a refractive lens, by a Fresnel lens or by a pancake lens, whereas the DoF extension may be provided by the DOE. whereas in examples where the single optical component arranged to provide both the imaging/magnification and the DoF extension, a DOE that is further arranged to provide the imaging/magnification may be applied.

In this regard, the illustration of FIG. 2A provides a non-limiting example where the lens assembly 203 comprises a refractive lens 203a and a DOE 203b arranged in the same optical axis, where the refractive lens 203a provides the imaging/magnification and the DOE 203b provides the DoF extension via the waveform coding. The refractive lens 203a may comprise, for example, a magnifying lens whereas the DOE 203b may be provided, for example, as an optical element, which may be integrated to the refractive lens 203a or as an element that is physically separate from the refractive lens 203 and arranged at a predefined distance from (and in close proximity to) the refractive lens 203a. The optical characteristics of the lens assembly 203 formed by the refractive lens 203a and the DOE 203b result in providing a substantially uniform frequency response over the depth range of the NED assembly 201, which is illustrated in FIG. 2A via (virtual) image planes 204-1, 204-2, 204-3, 204-4 and 204-5 that correspond to respective accommodation depths within the depth range of the NED assembly 201. In this regard, the image planes 204-1, 204-2, 204-3, 204-4, 204-5 represent a plurality of image planes (that correspond to a respective plurality of accommodation depths) and they may be jointly referred to via a reference number 204, whereas any individual image plane among the plurality of image planes 204 may be referred to via a reference number 204-*k*.

In the following, various aspects pertaining to the lens assembly 203 and to the DOE therein are (also) described with references to the non-limiting example of FIG. 2A and the DOE 203b included therein, whereas these aspects readily generalize into the lens assemblies 203 and/or DOEs having characteristics different from those described for the non-limiting example of FIG. 2A. Moreover, it is worth noting that even though the description herein refers to multiple discrete (virtual) image planes 204-*k*, this is a choice made for illustration purposes, whereas in a real-life implementation of the NED assembly 201 the plurality of image planes 204 may comprise a predefined set of discrete (virtual) image planes 204-*k* at respective distances from the display plane or the plurality of image planes 204 may comprise a (virtual) image plane 204-*k* that may reside at any distance from the display plane within the depth range of the NED assembly 201.

Figure 2B:
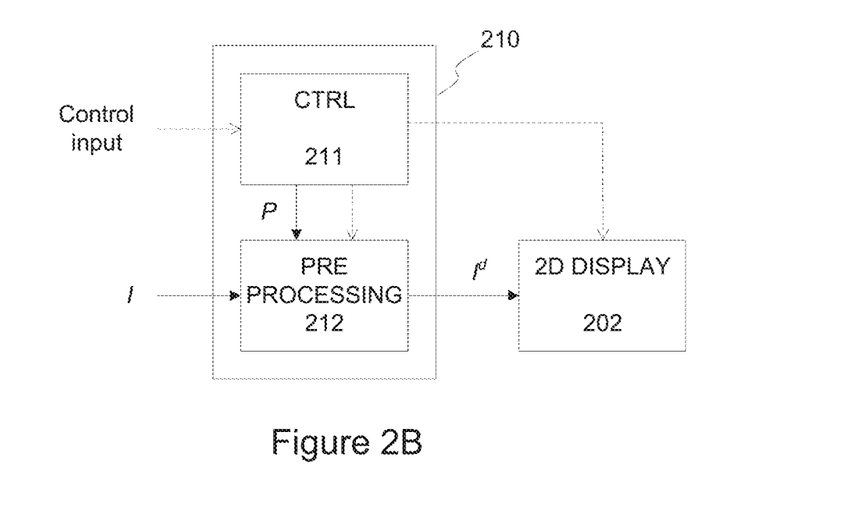
FIG. 2B illustrates a block diagram of some components of a near-eye display assembly.

FIG. 2B illustrates a block diagram of some components of a display controller 210 which is applicable for preprocessing input images for rendering on the 2D display 202 in a manner that facilities providing the viewer with an accommodation invariant 3D presentation of an image suppled as input to the display controller 210 when viewed through the lens assembly 203. The display controller 210 may be provided as an element of the NED assembly 201 and/or as an element of the NED device making use of the pair of NED assemblies 201. The display controller 210 comprises a control portion 211 and an image preprocessing portion 212, where the image preprocessing portion 212 may be arranged to operate at least partially under control of the control portion 211 and the control portion 211 may be arranged to control at least some aspects of operation of the 2D display 202 that relate to the manner of displaying images thereon. Operation of the control portion 211 may be at least partially controlled via control input provided thereto, e.g. via a user interface the NED device. According to an example, the display controller 210 may be implemented via operation of a computing apparatus that comprises one or more processors and one or more memories for storing one or more computer programs, where the one or more computer programs are arranged to cause the computing apparatus to operate as the display controller 210 according to the present disclosure when executed by the one or more processors.

The display controller 210, e.g. the image preprocessing portion 212 therein, may receive a time series of stereoscopic image pairs and derive a corresponding time series of preprocessed image pairs based on the time series of stereoscopic image pairs, which are applicable for providing an accommodation invariant 3D presentation of scenes captured in the time series of stereoscopic image pairs via rendering them on the respective 2D displays 201 of the two NED assemblies 201 of a NED device. Hence, for each of the two NED assemblies 201 of the NED device, the image preprocessing portion 212 may be arranged to receive a respective time series of input images I(t) and to derive, based on the respective received time series of input images I(t), a respective corresponding time series of preprocessed images $I^d(t)$ to be displayed via the 2D display 202 of the respective NED assembly 201 in order to provide the presentation of the 3D scene.

In this regard, any single image of the time series of input images I(t) may be referred to as an input image I, whereas any single image of the time series of preprocessed images $I^d(t)$ may be referred to as a preprocessed image $I^d$. Herein, the input image I refers to pixel values of the underlying input image, whereas the preprocessed image $I^d$ refers to pixel values of the underlying preprocessed image. In a non-limiting example, the input images I and the corresponding preprocessed images $I^d$ may comprise respective RGB images that provide respective pixel values for each pixel position of the respective image I, $I^d$ separately in red, green and blue color channels. In some examples, the time series of stereoscopic image pairs may be accompanied by a corresponding time series of depth maps D(t), i.e. each stereoscopic image pair of the time series may be accompanied by a corresponding depth map D that provides respective depth information for each pixel of the corresponding stereoscopic image pair. The image preprocessing portion 212 may apply the depth information received in the time series of depth maps D(t) in the process of deriving the corresponding time series of preprocessed images $I^d(t)$ based on the time series of input images I(t). In the following, various aspects related to operation of the image preprocessing portion 212 of the display controller 210 are predominantly described via references to one of the two NED assemblies 210 of a NED device and further via references to receiving a single input image I and deriving a corresponding preprocessed image $I^d$ based on the received input image I, whereas processing of the single input image I readily generalized into carrying out the corresponding processing for a plurality of images in the respective time series of input images I(t) for each of the two NED assemblies 201 of a NED device. In this regard, the aspect of deriving the preprocessed image $I^d$ based on the received input image I may be also considered as processing the received input image I into the corresponding preprocessed image $I^d$.

The image preprocessing portion 212 may be arranged to process the input image I into the corresponding preprocessed image $I^d$ via application of a predefined preprocessing procedure, which is matched with optical characteristics of the lens assembly 203 and, in particular, with the DOE therein in order to facilitate accommodation invariant 3D presentation at the image planes 204-$k$ within the depth range of the NED assembly 201, which exhibits extended DoF compared to a conventional stereoscopic NED. The preprocessing procedure may be considered to provide encoding of the input image I into the corresponding preprocessed image $I^d$, whereas the lens assembly 203 may be considered to provide extended DoF reconstruction of the preprocessed image $I^d$ within the depth range of the NED assembly 201. In this regard, at least some characteristics of the preprocessing procedure and diffraction characteristics of the DOE may be jointly designed to ensure providing a sufficient extent of accommodation invariance for operation of the NED assembly 201.

The preprocessing procedure may be arranged to process the input image I into the corresponding preprocessed image $I^d$ in a manner that is different for different locations of the display plane. In other words, the preprocessing procedure may be carried out in a display-plane-position-aware manner, which may result in providing different preprocessing characteristics for different sub-areas of the display plane. Such non-uniform processing of sub-areas of the image areas at different positions across the display plane serves to compensate for light transmission characteristics that differ from one display-plane position to another due to differences in transmission characteristics through the lens assembly 203 at different positions of the lens plane. The display-plane-position-aware preprocessing may be provided, for example, via dividing the image area into a plurality of sub-areas and deriving each of the plurality of sub-areas of the image area of the preprocessed image $I^d$ in a manner that depends on its position P within the image area.

In this regard, the display-plane-position-aware preprocessing arises from the fact that the pupil 110$a$ of the eye 110 of the viewer is smaller than a lens aperture of the lens assembly 203, which has at least the following consequences:

only a sub-portion of light from each pixel displayed on the display plane and transmitted through the lens assembly 203 enters through the pupil 110$a$ and meets the retina of the eye 110; and only a sub-portion of the lens and DOE aperture is involved in transmitting the light from a certain pixel of the display plane through the lens assembly 203 and through the pupil 110$a$ to the retina of the eye 110, where this sub-portion may be referred to as a (virtual) sub-aperture associated with the respective pixel.

Concerning the latter point above, the location of a sub-aperture through which the light from a certain pixel of the display plane enters the retina depends on the display-plane position of the respective pixel, on the distance between the display plane and the lens assembly 203, and on the (assumed) distance between the lens assembly 203 and the eye 110 of the viewer. In particular, the location of the sub-aperture (e.g. its center point) in the lens plane and an angle of incidence ($\theta$, $\phi$) of the light received therethrough at the pupil 110$a$ varies with the pixel position ($\xi$, $\eta$) on the display plane. Hence, light from different positions of the display plane arrive at the retina of the eye 110 via different paths and via different (virtual) sub-apertures of the lens aperture, which results in sub-aperture-dependent light transmission characteristics through the lens assembly 203. These light transmission characteristics may be modeled via a display point spread function (PSF) at the reference plane 206, which is dependent on the position of the respective sub-aperture on the lens plane (e.g. on its distance to the center axis of the lens assembly 203), whereas the display-plane-position-aware preprocessing procedure may be arranged to account for these differences in the light transmission characteristics, thereby contributing towards keeping a broad field of view (FoV) without compromising DoF.

Figure 3A:
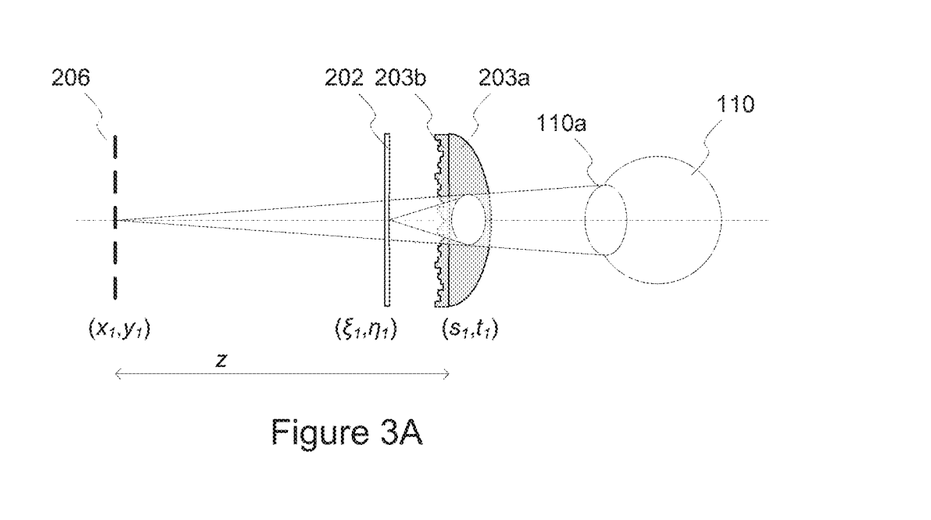
FIG. 3A schematically illustrates reception of light from a pixel of a display at an eye through a sub-aperture of a lens plane.
Figure 3B:
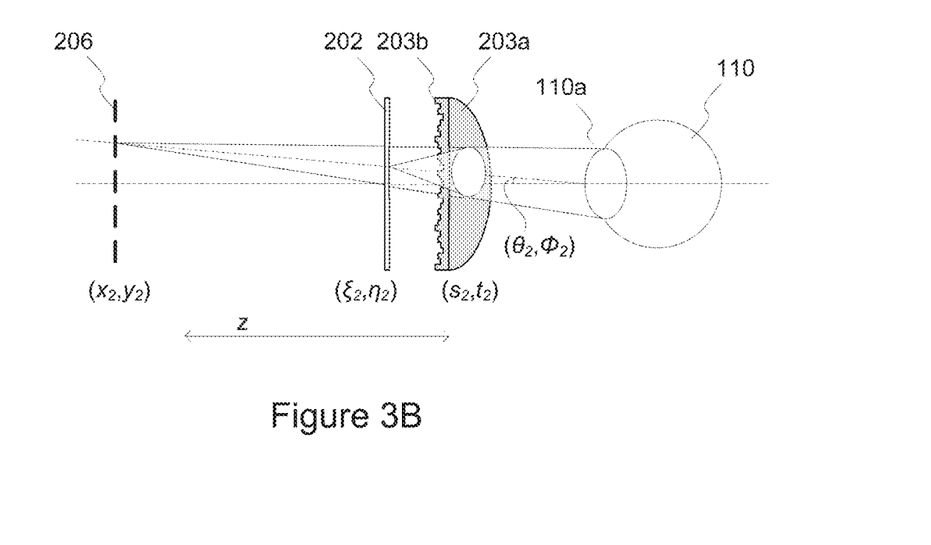
FIG. 3B schematically illustrates reception of light from a pixel of a display at an eye through a sub-aperture of a lens plane.

Respective examples of FIGS. 3A and 3B illustrate respective sub-apertures for two different pixel positions of the display plane, where the sub-apertures are depicted as respective ovals overlaid on the refractive lens 203$a$. In both examples the preprocessed image $I^d$ is imaged at the reference plane 206 at a distance z from the lens plane. The example of FIG. 3A illustrates reception of light from a first pixel position $(\xi_1, \eta_1)$ that resides on the center axis of the lens assembly 203 and, consequently, light from the first pixel position $(\xi_1, \eta_1)$ is imaged at a position $(x_1, y_1)$ at the reference plane 206 and it arrives at the pupil 110a at a zero angle of incidence and hence through a first sub-aperture that is centered at the center axis of the lens assembly 203 at a position $(s_1, t_1)$ of the lens plane. The example of FIG. 3B illustrates reception of light from a second pixel position $(\xi_2, \eta_2)$ that is offset from the center axis of the lens assembly 203 and, consequently, light from the second pixel position $(\xi_2, \eta_2)$ is imaged at position $(x_2, y_2)$ at the reference plane 206 and it arrives at the pupil 110a in a non-zero angle of incidence $(\theta_2, \phi_2)$ and hence through a second sub-aperture that is offset from the center axis of the lens assembly 203 and centered at a position $(s_2, t_2)$ of the lens plane.

Hence, the preprocessing procedure may be designed via consideration of a plurality of sub-apertures that may have a shape and size that approximates those of a typical (e.g. an average) pupil 110a and that jointly cover the lens aperture in its entirety without any gaps therebetween. Along the lines described in the foregoing, the sub-apertures of the lens plane at least conceptually map to corresponding sub-areas of the display plane (e.g. to corresponding sub-groups of pixels of the display plane), whereas the sub-areas of the display plane further map to corresponding sub-areas of an image area of the preprocessed image $I^d$. With the preprocessing procedure designed in consideration of the plurality of sub-apertures of the lens aperture that map to the corresponding sub-areas of the image area of the preprocessed image $I^d$, the processing applied by the preprocessing procedure to the input image I to derive a certain sub-area of the preprocessed image $I^d$ may be different from one sub-area to another, thereby resulting in the preprocessing procedure providing different preprocessing characteristics for derivation of different sub-areas of the image area.

The preprocessing procedure may be provided, for example, via application of at least one artificial neural network (ANN) arranged (e.g. trained) to process the input image I into the corresponding preprocessed image $I^d$ in a manner that accounts for the sub-apertures of the lens aperture of the lens assembly 203, as described in the following in further detail, thereby resulting in the display-plane-position-aware preprocessing procedure. As non-limiting examples in this regard, the at least one ANN employed by the image preprocessing portion 212 to implement the preprocessing procedure may be provided as at least one convolutional neural network (CNN) or as at least one derivative of a CNN. However, the CNN (or a derivative thereof) serves as a non-limiting example of an applicable ANN and in other examples an ANN of different kind may be employed instead without departing from the scope of the NED assembly 201 according to the present disclosure.

According to an example of applying the at least one ANN, the different processing for the different sub-areas of the image area of the corresponding preprocessed image $I^d$ may be provided via a single ANN that is trained to separately process each sub-area of the image area of the preprocessed image $I^d$ in dependence of its position within the image area. Training of such an ANN is described via examples provided in the following. In an example, such an ANN may take the input image I and an indication of the image sub-area of interest as input and provide the corresponding sub-area of the preprocessed image $I^d$ as output. In a variation of this approach, the input to the single ANN may further comprise depth information pertaining to the sub-area under consideration. Consequently, the preprocessed image $I^d$ in its entirety may be derived via applying the single ANN separately for each of the sub-areas of the image area and combining the sub-areas so obtained into the preprocessed image $I^d$.

According to another example of applying the at least one ANN, the different processing for the different sub-areas of the image area of the corresponding preprocessed image $I^d$ may be provided via application of a plurality of ANNs, each trained to process a respective sub-area of the image area of the preprocessed image $I^d$. Training of such plurality of ANNs is described via examples provided in the following. In an example, each of such ANNs may take the respective sub-area of input image I as input and provide the corresponding sub-area of the preprocessed image $I^d$ as output. In a variation of this approach, the input to each of the ANNs may further comprise depth information pertaining to the sub-area processed by the respective ANN. Consequently, the preprocessed image $I^d$ in its entirety may be derived via applying the plurality of ANNs for the corresponding sub-areas of the image area and combining the sub-areas so obtained into the preprocessed image $I^d$.

Along the lines described in the foregoing, according to a non-limiting example the DOE may comprise an optical element that is arranged to implement wavefront coding that aims at providing a substantially uniform frequency response over the depth range of the NED assembly 201 based on the preprocessed image $I^d$ displayed on the 2D display 202. In this regard, the DOE may be arranged to cause the lens assembly 203 to introduce a lens-plane-position dependent phase delay to the light transmitted therethrough. In other words, the DOE may be arranged to provide phase delay that may be different at different positions (e.g. sub-portions) of the lens plane to facilitate providing an accommodation invariant 3D presentation of the input image I across the depth range of the NED assembly 201. The phase delay through different positions of the lens plane may be denoted as $\Phi(s, t)$, where the tuple (s, t) serves to indicate 2D coordinates at the lens plane. The variation in the phase delay through different sub-portions of the DOE may be provided via the non-uniform thickness of the optical element, as schematically illustrated for the DOE 203b in the example of FIG. 2A. As an example, such a non-uniform thickness may be implemented via a profile defined via a height map d(s, t) that defines the thickness of the DOE 203b across the lens plane positions. In this regard, the phase delay $\Phi(s, t)$ may be translated into the height map d(s, t) and the height map d(s, t) may be translated into the phase delay $\Phi(s, t)$ in consideration of optical characteristic of the material applied for implementing the lens element that serves as the DOE 203b.

In other examples, the DOE included in the lens assembly 203 may be different from the DOE 203b of the example of FIG. 2A. As examples in this regard, the DOE may be provided via application of phase-modulating metamaterial arranged e.g. as a meta-surface, where the desired phase delay across positions of the lens aperture of the lens assembly 203 may be provided via controlling at least one aspect (e.g. orientation and/or size) of a nanostructure of the meta-surface accordingly.

Figure 4:
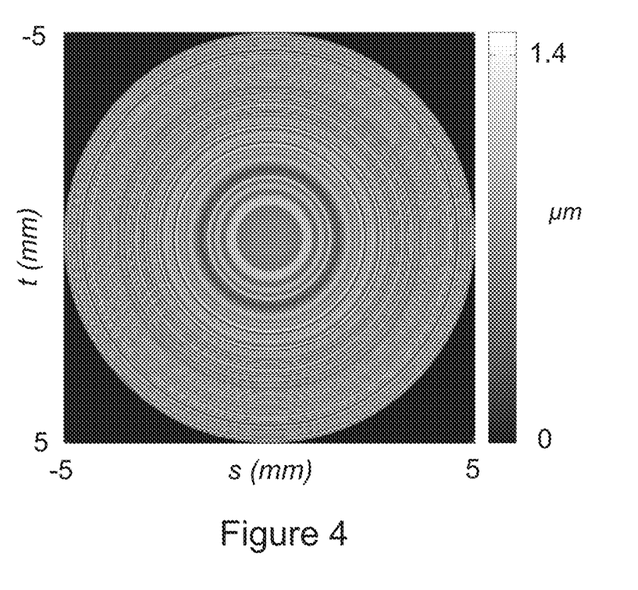
FIG. 4 illustrates a height map for a dispersive optical element according to an example.

According to a non-limiting example, the phase delay $\Phi(s, t)$ may be rotationally symmetric with respect to the center axis of the lens assembly 203. In scenarios according to the example of FIG. 2A this may be accomplished via application of a height map d(s, t) that is rotationally symmetric with respect to the center axis of the lens assembly 203 (and hence with respect to the center axis of the DOE 203b). This is a choice that simplifies the design of the DOE while at the same time accounting for the fact that defocus aberration of the lens assembly 203 and the display PSF across the lens plane positions are typically rotationally symmetric with respect to the center axis of the lens assembly 203. According to other examples, the phase delay $\Phi(s, t)$ may not exhibit symmetry with respect to the center axis of the lens assembly 203 (or with respect to any other axis), which typically leads to increased complexity of design of the DOE (and the preprocessing procedure) while enhancing the possibility to control the phase delay $\Phi(s, t)$ across positions of the lens plane. In consideration of the DOE 203b in the framework of the example of FIG. 2A, FIG. 4 illustrates a non-limiting example of the height map d(s, t) that is symmetric with respect to the center axis of the lens assembly 203 and which may be hence applied to define the DOE 203b as a symmetric element with respect to its center axis.

Along the lines described above, the phase delay characteristics of the DOE across positions of the lens plane of the lens assembly 203 may be matched with the display-plane-position-aware preprocessing characteristics provided via operation of the preprocessing procedure in order to facilitate driving the accommodation depth of the viewer's eye 110 in a desired manner. In this regard, certain characteristics of the preprocessing procedure and the phase delay $\Phi(s, t)$ of the DOE may be designed via a joint procedure to ensure such matching characteristics.

As described in the foregoing, in various examples the preprocessing procedure may be provided via application of an ANN, whereas weights of the ANN that implement the preprocessing procedure may be determined via a training procedure carried out prior to application of the preprocessing procedure in the image preprocessing portion 212 of the display controller 210. The match between the preprocessing characteristics provided by the preprocessing procedure and the phase delay characteristics of the DOE may be provided via modeling and optimizing the phase delay $\Phi(s, t)$ as part of the training procedure applied for determining the weights of the ANN that serves to provide the preprocessing procedure.

Figure 5:
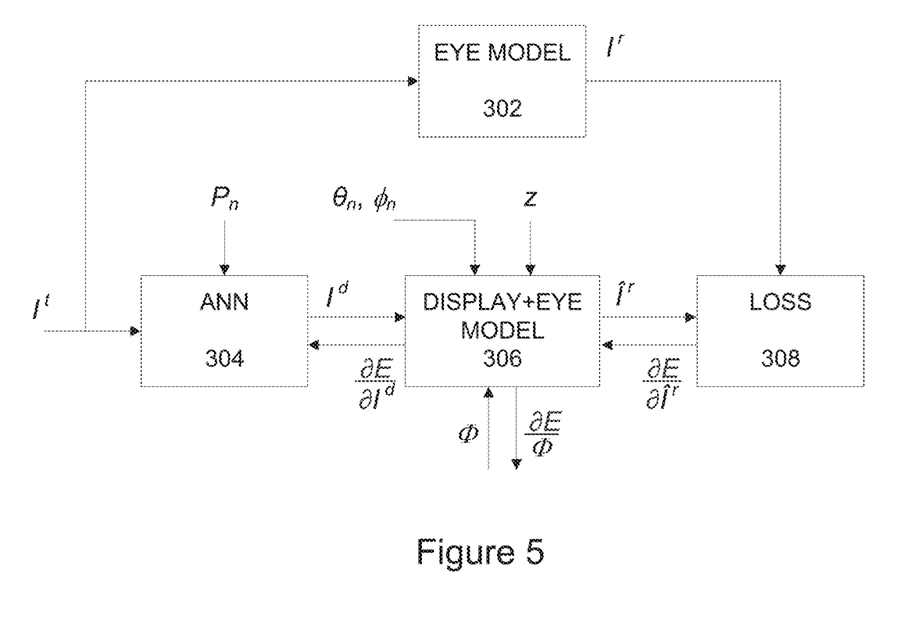
FIG. 5 illustrates a block diagram of some components of a learning model according to an example.

FIG. 5 illustrates a learning model 300 according to an example, where the learning model 300 may be applied to implement an iterative learning procedure that relies on supervised learning in order to determine the weights for the ANN that serves to implement the preprocessing procedure for the image processing portion 212 while at the same time determining a phase delay profile that defines the respective phase delay for a plurality of positions of the lens plane (s, t) of the lens assembly 203 and that may hence be applied as the phase delay $\Phi(s, t)$ for the DOE. Along the lines described in the foregoing, the phase delay $\Phi(s, t)$ may be applied for determination of the corresponding height map d(s, t) for the DOE 203b, if implemented as an element having a varying height across the DOE aperture e.g. according to the example of FIG. 2A. The learning procedure may apply a training dataset that includes a plurality of training images $I^t$, typically in the order of thousands of images and where the training data set includes color images (e.g. RGB images) depicting natural scenes that may be chosen in view of intended usage of the NED assembly 201 and/or the NED device making use of the NED assembly 201. According to an example, prior to starting the iterative learning procedure, the weights of the ANN and/or the phase delay profile may be initialized using (pseudo) random values, whereas in another example the initial values for the weights of the ANN and/or the phase delay profile may comprise respective values obtained via an earlier learning procedure.

The training dataset may comprise images, where each training image I t may define the respective pixel values, which may be provided as input to the learning model 300 (as illustrated in FIG. 5) in the course of the iterative learning procedure. In some examples, the training dataset may further comprise respective depth maps $D^t(t)$, which may be likewise provided as input to the learning model 300 (not shown in the illustration of FIG. 5) together with the corresponding training images $I^t$ in the course of the learning procedure.

According to an example, the learning procedure may be carried out via operation of a computing apparatus that comprises one or more processors and one or more memories for storing one or more computer programs, where the one or more computer programs are arranged to cause the computing apparatus to carry out the learning procedure described in the present disclosure when executed by the one or more processors. According to another example, the learning procedure may be carried out via usage of a plurality of (i.e. two or more) computing apparatuses of the kind described above, mutatis mutandis.

The learning model 300 applies an eye model 302 for processing each training image $I^t$ into a corresponding reference retinal image $I^r$, which models direct (or natural) viewing of the respective training image $I^t$ without considering the effect of the NED assembly 201 caused by the combined effect of the preprocessing procedure and the lens assembly 203. The reference retinal image $I^r$ is derived for a given accommodation state of the eye, where the eye is assumed to accommodate at a reference plane that resides within the depth range of the NED assembly 201 and represents the conjugate plane of the retina of the eye 110 of the viewer. The reference retinal image $I^r$ serves as the ground truth image for the corresponding training image $I^t$ in the framework of learning model 300. The eye model 302 may be arranged to model chromatic aberrations of (typical) eye optics and the diffraction-limited resolution of the eye 110 due to a finite size of the pupil 110a, thereby deriving the reference retinal image $I^r$ as one that accounts for at least some optical limitations of the eye 110. This may be accomplished, for example, via convolution of the corresponding training image with a diffraction-limited PSF with respect to the viewer that represents the chromatic aberrations of the eye 110. The reference retinal image $I^r$ derived based on the corresponding training image $I^t$ remains the same throughout the iteration rounds and hence the learning procedure may involve determining the corresponding reference retinal image $I^r$ based on each training image $I^t$ of the training dataset before entering the iterative learning procedure or (only) during the first iteration round of the iterative learning procedure.

At each iteration round of the learning procedure, each training image $I^t$ is passed through learning model 300, which results in carrying out the following operations based on the respective training image $I^t$:

select one or more sub-apertures of the lens plane for the respective iteration round and determine respective one or more sub-areas of an image area of the respective training image $I^t$ that spatially correspond to the selected one or more sub-apertures, process the determined one or more sub-areas of the respective training image $I^t$ by at least one ANN 304 into spatially corresponding one or more sub-areas of a preprocessed image $I^d$ using current weights of the at least one ANN 304 in consideration of their respective positions $P_n$ within the image area, process said one or more sub-areas of the preprocessed image $I^d$ by a display and eye model 306 into spatially corresponding one or more sub-areas of a simulated retinal image $\hat{I}^r$ in accordance with current phase delay profile of the display model and in consideration of an accommodation depth z selected for the respective iteration round, and determine a difference between said one or more sub-areas of the simulated retinal image $\hat{I}^r$ and spatially corresponding one or more sub-areas of the reference retinal image $I^r$ by a loss function 308.

At the end of each iteration round, the weights of the at least one ANN 304 and at least a portion of the phase delay profile that spatially corresponds to the one or more sub-apertures selected for the respective iteration round are updated based on the determined differences between the respective one or more sub-areas of the simulated retinal images $\hat{I}^r$ and the spatially corresponding one or more sub-areas of the reference retinal images $I^r$. As an example in this regard, the updating may be carried out via usage of a gradient descent method. The learning procedure may be carried out until one or more predefined convergence criteria that pertain to the difference between the simulated retinal images $\hat{I}^r$ and the corresponding reference retinal images $I^r$ are met and/or until a predefined number of iteration rounds have been carried out. Once the learning procedure has converged and/or the predefined number of iteration rounds have been completed, the weights of the at least one ANN 304 at the end of the final iteration round may be adopted as the weights of the at least one ANN applied to implement the preprocessing procedure in the image preprocessing portion 212 of the display controller 210 and the phase delay profile at the end of the final iteration round may be adopted as the phase delay $\Phi$ (s, t) for the DOE of the NED assembly 201.

According to an example, the learning model 300 may directly consider parameters that define the phase delay profile instead of considering the phase delay profile as such. In examples that employ a DOE, which is characterized by its material properties and its thickness (e.g. the DOE 203b according to the example of FIG. 2A), the parameter(s) considered in the course of the learning procedure via application of the learning model 300 may comprise the height map d(s, t) across positions of the lens plane of the lens assembly 203. In another example, the phase delay profile for the optical element serving as the DOE may be considered via respective coefficients of a set of predefined phase functions in a suitable signal space, e.g. Zernike polynomials. In examples where the DOE is provided via usage of a metamaterial/meta-surface, the phase-delay-defining parameters considered in the course of the learning procedure may comprise one or more geometric characteristics (such as radius and/or orientation) of the nanostructure implementing the meta-surface across positions (s, t) of the lens plane. Regardless of the manner of defining the phase delay profile in the course of the learning procedure, the phase delay profile may be defined via defining the respective phase delay for positions (s, t) of the lens plane, where the positions (s, t) may from a substantially uniform grid over the lens plane or the positions (s, t).

As described in the foregoing, at each iteration round the learning model 300 considers one or more sub-apertures of the lens plane and the one or more sub-areas of the image area of the training images $I^t$ that spatially correspond to the one or more sub-apertures considered at the respective iteration round. In this regard, as described in the foregoing e.g. with references to FIGS. 3A and 3B, each sub-aperture of the lens plane maps (to a corresponding sub-area of the display plane and hence) to a corresponding sub-area of the image area, where the mapping depends on the spatial relationship between the respective positions of the 2D display 202 and the lens assembly 203 and their distance from the pupil 110a. In this regard, the illustration of FIG. 5 suggests defining the one or more sub-apertures via the respective one or more angles of incidence $(\theta_n, \phi_n)$ at the pupil 110a, which map to the corresponding one or more sub-areas of the image area at positions $P_n$.

According to an example, a single sub-aperture and the spatially corresponding sub-area of the training images $I^t$ is considered at each iteration round. In this regard, the single sub-aperture of the lens plane to be applied for all training images $I^t$ in a certain iteration round of the learning procedure may be selected (substantially) randomly from a plurality of predefined sub-apertures, whereas in another example the sub-aperture to be applied for the certain iteration round may be varied from one iteration round to another via selecting one of the plurality of predefined sub-apertures according to a predefined rule. The plurality of sub-apertures that are available for consideration in the learning procedure may have respective predefined positions within the lens plane and they may have a predefined shape and size and that approximate those of a typical (e.g. an average) pupil 110a. As an example, the plurality of sub-apertures may jointly cover the lens aperture in its entirety without any gaps therebetween. As non-limiting examples in this regard, the sub-apertures may have a rectangular or hexagonal shape and the sub-apertures may be non-overlapping or they may be partially overlapping.

According to another example, a set of two or more sub-apertures and the corresponding one or more sub-areas of the image area of the training images $I^t$ maybe be applied at each iteration round, where the set of two or more sub-apertures to be applied at a certain iteration round may be selected (substantially) randomly from the plurality of predefined sub-apertures or the set of two or more sub-apertures to be applied for the certain iteration round may be selected from the plurality of predefined sub-apertures according to a predefined rule. As a specific example of the latter, the set of two or more sub-apertures selected for the certain (and each) iteration round may include the plurality of sub-apertures that jointly cover the lens aperture in its entirety.

For each training image $I^t$, the input to the at least one ANN 304 at a given iteration round may comprise the pixel values of the respective training image $I^t$ within the image sub-area considered in the respective iteration round together with information that identifies the image-area-position $P_n$ of the image sub-area under consideration, whereas the output of the at least one ANN 304 may comprise corresponding pixel values of the corresponding image sub-area of the preprocessed image $I^d$. The position $P_n$ of the image sub-area within the image area may be defined, for example, via the corresponding angle of incidence $(\theta, \phi)$ at the pupil 110a (as illustrated in FIG. 5), via the corresponding pixel position $(\xi, \eta)$ on the display plane or via the corresponding position of the lens plane (s, t). As described in the foregoing, in some examples the learning procedure may further comprise depth information obtained via the depth maps $D^r(t)$ associated with the training images $I^r(t)$ and, consequently, the input to the at least one ANN 304 may further comprise the depth information for the image sub-area under consideration in the respective iteration round, which may be obtained from the depth map $D^t$ associated with the training image $I^t$ under consideration. Along the lines described in the foregoing, the at least one ANN 304 may comprise, for example, at least one CNN or at least one modified CNN.

The display and eye model 306 may comprise a physics-based, differentiable simulation model that simulates transmission of the preprocessed image $I^d$ from the display plane through the lens assembly 203 in combination with an eye model to derive the corresponding simulated retinal image $\hat{I}^r$ at the reference plane. In this regard, the simulated retinal image $\hat{I}^r$ derived from the corresponding preprocessed image $I^d$ models the effect of the lens assembly 203 together with aberrations of (typical) eye optics and diffraction-limited resolution of the eye, thereby modeling viewing of the respective training image $I^t$ via the NED assembly 201. Along the lines described in the foregoing, the modeling of the lens assembly 203 involves modeling optical characteristics of the one or more sub-apertures of the lens plane selected for the respective iteration round via application of the current phase delay profile and in view of the accommodation depth z selected for the respective iteration round, whereas the eye modeling may be carried out in a similar manner as described in the foregoing for the eye model 302, mutatis mutandis. In particular, modeling of the optical characteristics may comprise modeling the display PSF in dependence of the respective lens-plane positions of the one or more sub-apertures selected for the respective iteration round and in dependence of the accommodation depth z selected for the respective iteration round. The applied one or more sub-apertures of the lens aperture may be defined, for example, via the corresponding angle of incidence $(\theta, \phi)$ at the pupil 110a (as illustrated in FIG. 5), via the corresponding pixel position $(\xi, \eta)$ on the display plane or via the corresponding position of the lens plane (s, t) that defines a center point of the sub-aperture of under consideration at the respective iteration round.

According to an example, the accommodation depth z to be applied for all training images in a certain iteration round of the learning procedure may be chosen (substantially) randomly from a set of predefined accommodation depths or from a predefined range of accommodation depths that cover the (desired) depth range of the NED assembly 201, whereas in another example the accommodation depth to be applied for the certain iteration round may be varied from one iteration round to another via choosing one the predefined accommodation depths or via choosing an accommodation depth from the predefined range according to a predefined rule.

The loss function 308 may determine the difference between the simulated retinal images $\hat{I}^r$ and the corresponding reference retinal images $I^r$ as an objective error measure such as the L1-loss or the mean squared error (MSE) derived based on pixel-wise error (or difference) between the two images $\hat{I}^r$, $I^r$ under consideration. Additionally or alternatively, the difference may be determined as a perceptual error measure such as the structural similarity measure (SSIM) that aims at predicting perceived error (or difference) between the two images $\hat{I}^r$, $I^r$ under consideration. According to an example, the loss function 308 may further involve applying a so-called neural contrast sensitivity function (NCSF) before determining the difference between the respective images $\hat{I}^r$, $I^r$ in order to incorporate neural factors into the learning model. Usage of the NCSF may contribute via enabling improved tradeoff between spatial resolution and the DoF provided by the NED assembly 201.

While the above description of various examples pertaining to the application of the learning model 300 in the iterative learning procedure refers to processing of images in general, the images processed by the preprocessing procedure may comprise respective RGB images that involve three separate color channels (as described in the foregoing) and, consequently, the training model 300 may be applied to consider the three color channels separately from each other in the course of the iterative learning procedure.

The examples pertaining to the learning procedure provided in the foregoing (implicitly) assume that the operation of the at least one ANN 304 involves training of a single ANN that is arranged to process each sub-area of the image area of the preprocessed image $I^d$ in dependence of its position $P_n$ within the image area. Hence, as described in the foregoing the, the input to the single ANN in the course of the learning procedure may comprise the pixel values of the respective training image $I^t$ within the image sub-area considered in the respective iteration round together with information $P_n$ that identifies the image sub-area under consideration, whereas the output of the single ANN may comprise corresponding pixel values of the corresponding image sub-area of the preprocessed image $I^d$ (where the input to the single ANN may optionally further include the respective depth information).

According to other examples, the operation of the at least one ANN 304 may involve training a plurality of ANNs, each arranged to process a corresponding sub-area of the image area of the preprocessed image $I^d$. Hence, at each iteration one or more ANNs that corresponds to the respective one or more image sub-areas under consideration at the respective iteration are being trained and/or updated. Along the lines described in the foregoing, in the course of the learning procedure the input to the respective ANN may comprise the pixel values of the respective training image $I^t$ within the respective image sub-area under consideration in the respective iteration round, whereas the output of the respective ANN may comprise corresponding pixel values of the corresponding image sub-area of the preprocessed image $I^d$ (where the input to the respective ANN may optionally further include the respective depth information).

Figure 6:
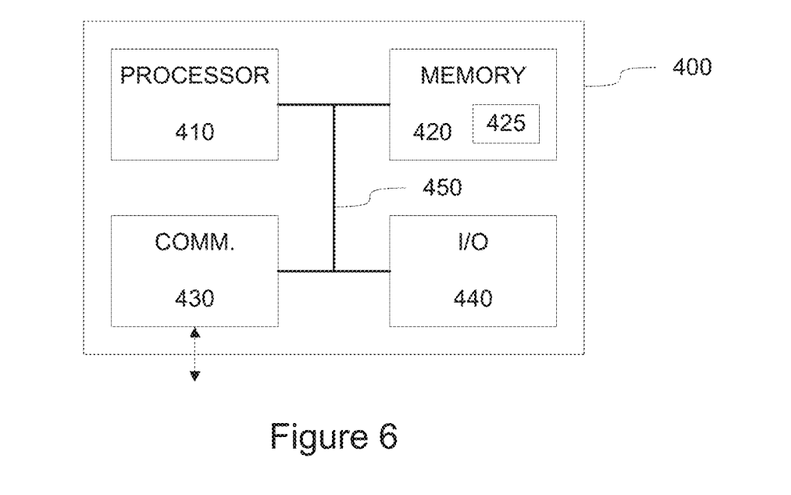
FIG. 6 illustrates a block diagram of some components of an apparatus according to an example.

FIG. 6 illustrates a block diagram of some components of an apparatus 400 that may be employed to implement at least some aspects of the display controller 210 or to carry out the iterative learning procedure described in the foregoing. Although described herein with references to a single apparatus 400, the at least some aspects of the display controller 210 or the iterative learning procedure described in the foregoing may be implemented via joint operation of two or more apparatuses 400 arranged to provide a cloud-based computing service.

The apparatus 400 comprises a processor 410 and a memory 420. The memory 420 may store data and computer program code 425. The apparatus 400 may further comprise communication means 430 for wired or wireless communication with other apparatuses and/or user I/O (input/output) components 440 that may be arranged, together with the processor 410 and a portion of the computer program code 425, to provide the user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus 400 are communicatively coupled to each other via a bus 450 that enables transfer of data and control information between the components.

The memory 420 and a portion of the computer program code 425 stored therein may be further arranged, with the processor 410, to cause the apparatus 400 to operate as the display controller 210 or to carry out the iterative learning procedure described in the foregoing (as applicable). The processor 410 is configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement at least some aspects of the display controller 210 or carry out the iterative learning procedure described in the foregoing (as applicable) when loaded into the processor 410. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus 400 to operate as the display controller 210 or to carry out the iterative learning procedure described in the foregoing (as applicable). Hence, the apparatus 400 may comprise at least one processor 410 and at least one memory 420 including the computer program code 425 for one or more programs, the at least one memory 420 and the computer program code 425 configured to, with the at least one processor 410, cause the apparatus 400 to perform at least some aspects of the display controller 210 or the iterative learning procedure described in the foregoing (as applicable).

The computer program code 425 may be provided e.g. as a computer program product comprising at least one computer-readable non-transitory medium having the computer program code 425 stored thereon, which computer program code 425, when executed by the processor 410 causes the apparatus 400 to perform at least some aspects of the display controller 210 or the iterative learning procedure described in the foregoing (as applicable). The computer-readable non-transitory medium may comprise a memory device or a record medium that tangibly embodies the computer program. As another example, the computer program may be provided as a signal configured to reliably transfer the computer program.

Reference(s) to a processor herein should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

The invention claimed is:

1. A stereoscopic near-eye display, NED, assembly for a NED device including a pair of NED assemblies, the NED assembly comprising:
 a two-dimensional (2D) display for rendering an image for viewing by an eye of a viewer;
 a lens assembly arranged at a predefined distance from the 2D display to allow for viewing the image rendered via the 2D display therethrough, wherein the lens assembly comprises a diffractive optical element (DOE) arranged to provide a phase delay that is different through a plurality of positions of its aperture; and
 a display controller comprising a preprocessing portion arranged to derive a preprocessed image based on the received image via application of a preprocessing procedure that is arranged to apply an image-area-position dependent preprocessing in derivation of different sub-areas of an image area of the preprocessed image to account for different transmission characteristic through different sub-apertures of the lens aperture of the lens assembly and supply the preprocessed image for rendering via the 2D display, and
 wherein preprocessing procedure and the lens assembly are arranged for displaying the preprocessed image as one that is perceived as sharp for a plurality of accommodation depths that reside within an extended depth of field (DoF) of the NED assembly when viewed through the lens assembly so as to facilitate providing accommodation invariant 3D presentation based on the preprocessed image via operation of the NED device.

2. The NED assembly according to claim 1, wherein the preprocessing portion comprises at least one artificial neural network (ANN) arranged to implement the preprocessing procedure.

3. The NED assembly according to claim 2, wherein the at least one ANN comprises at least one convolutional neural network (CNN).

4. The NED assembly according to claim 1, wherein the at least one ANN comprises a single ANN trained to process each of a plurality of sub-areas of the image area of the preprocessed image in dependence of its position within the image area.

5. The NED assembly according to claim 1, wherein the at least one ANN comprises a plurality of ANNs, each ANN trained to process a respective one of a plurality of sub-areas of the image area of the preprocessed image.

6. The NED assembly according to claim 1, wherein the DOE comprises an optical element having a thickness that is defined separately for said plurality of positions to provide said phase delay that is different through said plurality of positions of its aperture.

7. An apparatus for deriving a preprocessing procedure and a phase delay profile for a stereoscopic near-eye display (NED) assembly according to claim 1, the apparatus arranged to apply respective learning models to jointly derive at least one artificial neural network (ANN) that serves as the preprocessing procedure and the phase delay profile that defines a respective phase delay for a plurality of positions of the DOE via an iterative learning procedure based on a plurality of training images, wherein the apparatus is arranged to carry out the following at a plurality of iteration rounds:
 process each of the plurality of training images trough a learning model that is arranged to carry out the following:
 select one or more sub-apertures for the respective iteration round and determine respective one or more sub-areas of an image area of the respective training image that spatially correspond to the selected one or more sub-apertures,
 process the determined one or more sub-areas of the respective training image by the at least one ANN to determine spatially corresponding one or more sub-areas of a preprocessed image using current weights of the at least one ANN in consideration of their respective positions within the image area, process said one or more sub-areas of the preprocessed image by a display and eye model into spatially corresponding one or more sub-areas of a simulated retinal image in accordance with current phase delay profile and in consideration of an accommodation depth selected for the respective iteration round, and determine, by a predefined loss function, a difference between said one or more sub-areas of the simulated retinal image and spatially corresponding one or more sub-areas of a corresponding reference retinal image; and update the weights of the at least one ANN and a portion of the phase delay profile that spatially corresponds to the one or more selected sub-apertures based on respective differences determined for the plurality of training images.

8. The apparatus according to claim 7, arranged to update the weights of the at least one ANN and the phase delay profile via usage of a gradient descent method.

9. The apparatus according to claim 7, arranged to derive said corresponding reference retinal image via applying an eye model that represents one or more optical limitations of an eye to the respective training image.

10. The apparatus according to claim 7, arranged to carry out one of the following:
select one of a plurality of predefined accommodation depths as the accommodation depth for the respective iteration round,
select the accommodation depth for the respective iteration round from of a predefined range of accommodation depths.

11. The apparatus according to claim 7, arranged to select one of a plurality of predefined sub-apertures for the respective iteration round,
wherein each predefined sub-aperture has a respective position within the lens aperture and has a respective predefined shape and size, and
wherein the plurality of sub-apertures jointly cover the DOE aperture in its entirety.

12. The apparatus according to claim 7, arranged to select two or more of a plurality of predefined sub-apertures for the respective iteration round,
wherein each predefined sub-aperture has a respective position within the lens aperture and has a respective predefined shape and size, and
wherein the plurality of sub-apertures jointly cover the DOE aperture in its entirety.

13. The apparatus according to claim 7, wherein the display and eye model is arranged to derive the spatially corresponding one or more sub-areas of the preprocessed retina image based on said one or more sub-areas of the preprocessed image via application of phase delay according to the current phase delay profile defined for the one or more sub-apertures selected for the respective iteration round and model optical characteristics of the one or more sub-apertures selected for the respective iteration round in consideration of the accommodation depth selected for the respective iteration round.

14. The apparatus according to claim 13, wherein application of said optical characteristics comprises applying a point spread function (PSF) chosen in accordance with the respective positions of the one or more sub-apertures selected for the respective iteration round in consideration of the accommodation depth selected for the respective iteration round.

15. The apparatus according to claim 7, wherein the at least one ANN comprises at least one convolutional neural network (CNN).

16. The apparatus according to claim 7, wherein the at least one ANN comprises a single ANN trained to process each of a plurality of sub-areas of the image area of the preprocessed image in dependence of its position within the image area.

17. The apparatus according to claim 7, wherein the at least one ANN comprises a plurality of ANNs, each ANN trained to process a respective one of a plurality of sub-areas of the image area of the preprocessed image.

18. A method for deriving a preprocessing procedure and a phase delay profile for a stereoscopic near-eye display (NED) assembly according to claim 1, wherein the method comprises carrying out an iterative learning procedure based on a plurality of training images via application of respective learning models to jointly derive at least one artificial neural network (ANN) that serves as the preprocessing procedure and the phase delay profile that defines a respective phase delay for a plurality of positions of the DOE, the method comprising, for a plurality of iteration rounds:
processing each of the plurality of training images trough a learning model that comprises the following steps:
selecting one or more sub-apertures for the respective iteration round and determining respective one or more sub-areas of an image area of the respective training image that spatially correspond to the selected one or more sub-apertures,
processing the determined one or more sub-areas of the respective training image by the at least one ANN to determine spatially corresponding one or more sub-areas of a preprocessed image using current weights of the at least one ANN in consideration of their respective positions within the image area,
processing said one or more sub-areas of the preprocessed image by a display and eye model into spatially corresponding one or more sub-areas of a simulated retinal image in accordance with current phase delay profile and in consideration of an accommodation depth selected for the respective iteration round, and
determining, by a predefined loss function, a difference between said one or more sub-areas of the simulated retinal image and spatially corresponding one or more sub-areas of a corresponding reference retinal image; and
updating the weights of the at least one ANN and a portion of the phase delay profile that spatially corresponds to the one or more selected sub-apertures based on respective differences determined for the plurality of training images.

19. A computer program product comprising a non-transitory computer-readable storage medium having computer readable program code stored thereon, the computer readable program code comprising instructions that, when executed by a processor, cause the processor to perform the method according to claim 18.

* * * * *